United States Patent [19]
Gaveske

[11] Patent Number: 6,025,032
[45] Date of Patent: Feb. 15, 2000

[54] METHOD AND COMPOSITION FOR WATERPROOFING

[75] Inventor: John H. Gaveske, Blaine, Minn.

[73] Assignee: Poly Wall International, Inc., Minneapolis, Minn.

[21] Appl. No.: 09/274,180

[22] Filed: Mar. 23, 1999

Related U.S. Application Data

[63] Continuation-in-part of application No. 09/034,538, Mar. 3, 1998.

[51] Int. Cl.$^7$ ............................ B05D 1/02; E02D 19/12
[52] U.S. Cl. ................................ 427/393.6; 427/407.1; 52/169.14
[58] Field of Search ............................. 427/393.6, 407.1; 52/169.14

[56] References Cited

U.S. PATENT DOCUMENTS

| | | |
|---|---|---|
| 2,470,918 | 5/1949 | Chung . |
| 2,491,487 | 12/1949 | Faulwetter . |
| 2,716,619 | 8/1955 | Jobbins et al. . |
| 3,423,224 | 1/1969 | Schmidt et al. . |
| 3,660,214 | 5/1972 | Nichols, Jr. et al. . |
| 3,676,198 | 7/1972 | McGroarty . |
| 3,720,538 | 3/1973 | Bergmeister et al. . |
| 3,721,640 | 3/1973 | Wilhelm et al. . |
| 3,814,619 | 6/1974 | Kobayashi et al. . |
| 3,854,985 | 12/1974 | Suzuki et al. . |
| 3,861,944 | 1/1975 | Steinberg et al. . |
| 3,869,415 | 3/1975 | Williams . |
| 3,929,692 | 12/1975 | Offerman . |
| 3,967,012 | 6/1976 | Ebner . |
| 4,042,555 | 8/1977 | Raimondi et al. . |
| 4,064,092 | 12/1977 | Burroway et al. . |
| 4,101,482 | 7/1978 | Doss et al. . |
| 4,101,484 | 7/1978 | Doss . |
| 4,113,914 | 9/1978 | Doss ........................................ 428/355 |
| 4,141,737 | 2/1979 | Moon et al. . |
| 4,174,992 | 11/1979 | Fujii et al. . |
| 4,196,259 | 4/1980 | Augustin et al. . |
| 4,230,609 | 10/1980 | Burroway et al. . |
| 4,349,398 | 9/1982 | Kearns et al. . |
| 4,362,586 | 12/1982 | Uffner et al. . |
| 4,379,857 | 4/1983 | Hansen et al. . |
| 4,403,059 | 9/1983 | Laut et al. . |
| 4,420,524 | 12/1983 | Gorgati . |
| 4,435,472 | 3/1984 | Leah . |
| 4,474,833 | 10/1984 | Maxfield . |
| 4,478,912 | 10/1984 | Uffner et al. . |
| 4,482,382 | 11/1984 | Kanayama et al. . |
| 4,489,109 | 12/1984 | Puskar . |
| 4,507,365 | 3/1985 | Lower et al. . |
| 4,534,925 | 8/1985 | Harriett . |
| 4,534,926 | 8/1985 | Harriett . |
| 4,536,417 | 8/1985 | Shimizu . |
| 4,537,921 | 8/1985 | Uffner et al. . |
| 4,562,109 | 12/1985 | Harvey et al. . |
| 4,582,730 | 4/1986 | Elser et al. . |
| 4,613,649 | 9/1986 | Saeki et al. . |
| 4,693,923 | 9/1987 | McGroarty et al. . |
| 4,714,507 | 12/1987 | Ohgushi . |
| 4,804,693 | 2/1989 | Harvey et al. . |
| 4,937,033 | 6/1990 | Oshio et al. . |
| 5,028,487 | 7/1991 | Kindt et al. . |
| 5,078,931 | 1/1992 | Yanagihara et al. . |
| 5,079,088 | 1/1992 | McGroarty et al. . |

(List continued on next page.)

FOREIGN PATENT DOCUMENTS

| | | |
|---|---|---|
| 2 029 243 | 12/1971 | Germany . |
| 205 085 | 12/1983 | Germany . |
| 50-21020 | 3/1975 | Japan . |
| 62-210076 | 9/1987 | Japan . |
| 914605 | 3/1982 | U.S.S.R. . |

OTHER PUBLICATIONS

Degussa Corporation, Technical Bulletin Pigments, "Aerosil® for Lacquers and Paints", No. 68, 1–24 (May 1986).

Degussa Corporation, Technical Bulletin Pigments, "Aerosil® as a Thickening Agent for Liquid Systems", No. 23, 1–36 (Jul. 1989).

DuPont Chemicals, "Tetrahydrofuran: Properties, Uses, Storage, and Handling", 1–26 (Dec. 1991).

DuPont Chemicals, "Material Safety Data Sheet, Tetrahydrofuran", (Mar. 1992).

Discover™, Monthly Report (Oct. 1992).

Polymer Technology, Chapter 11, "Polystyrene and Copolymers", Chemical Publishing Inc., New York, N.Y., 284–317 (1979).

Goodyear Chemicals Pliolite Resins in Waterproofing Sealers, Sep. 1975.

Shell Chemical, "Online literature—Kraton Polymers for Coatings", http://www.shellchemical.com/chemsite.nsf/Literature/SC:1757–93R;53 pages (last updated Nov. 25, 1997).

Shell Chemical, "Online literature—Kraton® Polymers and Compounds—Typical Properties Guide", http://www-.shellchemical.com/chemsite.nsf/Literature/SC:68–96; 9 pages (last updated Nov. 25, 1997).

Shell Chemical, "online literature—Kraton® Polymers for Adhesives and Sealants", http://www.shellchemical.com/chemsite.nsf/Literature/SC:2426–96; 9 pages (last updated Nov. 25, 1997).

Richard J. Lewis, Sr., Hawley's Condensed Chemical Dictionary, 12th ed., Van Nostrand Reinhold Co., NY. See definitions of "olefin", "diene", and "diolefin", 1993.

Webster's Third New International Dictionary, Unabridged, G & C Merriam and Co., Springfield, MA. See definition of "resin", 1961.

Primary Examiner—Shrive Beck
Assistant Examiner—Jennifer L. Kolb
Attorney, Agent, or Firm—Merchant & Gould P.C.

[57] ABSTRACT

A method for waterproofing a substrate includes applying a coating composition to the surface of the substrate. The coating composition includes: (a) an organic solvent; (b) hydrocarbon resin; and (c) a polymer selected from the group consisting of a polyolefin homopolymer, a styrene-ethylene-butylene-styrene block copolymer with a styrene content of less than 60% by weight and mixtures thereof.

20 Claims, No Drawings

U.S. PATENT DOCUMENTS

| | | |
|---|---|---|
| 5,120,355 | 6/1992 | Imai . |
| 5,124,182 | 6/1992 | Kubo et al. . |
| 5,132,183 | 7/1992 | Gaidis et al. . |
| 5,145,748 | 9/1992 | Gaidis et al. . |
| 5,270,373 | 12/1993 | Wiercinski et al. . |
| 5,316,848 | 5/1994 | Bartlett et al. . |
| 5,346,943 | 9/1994 | Khungar et al. . |
| 5,482,737 | 1/1996 | Gaveske . |
| 5,496,615 | 3/1996 | Bartlett et al. . |
| 5,512,619 | 4/1996 | DeWacker et al. . |
| 5,534,303 | 7/1996 | Roberts et al. ............. 427/385.5 |
| 5,543,188 | 8/1996 | Te'eni . |
| 5,576,062 | 11/1996 | Gaveske . |
| 5,576,065 | 11/1996 | Gaveske ................. 427/407.1 |
| 5,624,971 | 4/1997 | Gaveske . |
| 5,658,971 | 8/1997 | Allin et al. . |
| 5,674,313 | 10/1997 | Aoyama et al. . |
| 5,807,638 | 9/1998 | Roberts . |

METHOD AND COMPOSITION FOR WATERPROOFING

RELATED APPLICATIONS

This is a continuation-in-part of, U.S. Ser. No. 09/034,538, filed Mar. 3, 1998, which application is expressly incorporated herein.

FIELD OF THE INVENTION

The present invention relates to a method and a polymeric composition for waterproofing. More particularly, the present invention relates to a method and composition using a hydrocarbon resin and a polymer having either one styrene-containing polymer or one olefin-containing polymer or a mixture of these polymers to waterproof.

BACKGROUND OF THE INVENTION

Structures used in construction, such as foundations and walls, include materials, such as masonry, cement, wood, plaster, stone, clay or brick that may be porous. Such porous materials can be degraded by water and/or loss of water from the porous materials. Below grade structures are often subjected to hydrostatic pressure from ground water. Above grade structures are subject to precipitation and water from other sources. A variety of methods and products for waterproofing and/or sealing these structures against outside water have been developed.

One type of waterproofing and/or sealing system includes polyvinyl or polyethylene sheeting adhered or fastened to the surface of the structure. If an adhesive is used to adhere the sheeting to the structure, the adhesive may not stick well due to dust (e.g., cement or stone dust) produced during construction and other activities and lose its adhesion over time. On the other hand, if fasteners, such as nails or staples, are used to attach the sheeting to the structure, the fasteners typically puncture the sheeting and the structure beneath, providing a channel through which water can flow. Moreover, there are seams between the sheets that require the use of a fastener or adhesive to close. The adhesive may be attacked by microorganisms and/or oxidation and degraded or may dissolve in water over time, allowing water to flow through the seam. Fasteners puncture the sheeting and allow water through the resulting holes. In addition, the waterproofing sheets are often difficult to form around non-uniform structures and adverse weather conditions may hinder the placement of the sheets on the structure. For example, wind may cause wrinkles in the sheet as it is positioned on the structure and, on very cold days, the sheets may tear or even shatter during installation.

Another type of waterproofing and/or sealing system includes the application of a coating composition on the structure. One common type of coating composition for waterproofing and sealing is tar- or asphalt-based. Although these compositions are relatively inexpensive and can be applied year-round, the materials in the composition often leach away from the wall. This often contaminates the soil and reduces the amount of protection afforded by the coating. Moreover, these compositions typically contain a large amount of organic material which may be attacked by soil- or water-borne microorganisms, thereby reducing the effectiveness of the coating.

Other types of coating compositions have been developed. Many of these coating compositions, however, do not produce a durable film over porous substrates (e.g., cement, masonry blocks, wood, etc.). Often, the film that is formed using these coating compositions is easily punctured and/or includes components that are degradable or leach away from the film thus losing its adhesion to substrates. These coating compositions need to be applied with a significant amount of volatile organic compounds as solvents. These emitted volatile organic compounds (VOCs) are limited by current environmental regulations. Moreover, a number of the coating compositions are difficult to apply and/or relatively expensive.

There is a need for alternative waterproofing and/or sealing compositions which emit less volatile organic compounds upon application, are durable, flexible, and stable in below grade and above grade applications. Such compositions may also be useful for coating other substrates, as well.

SUMMARY OF THE INVENTION

The present invention relates to methods and compositions for waterproofing and sealing a surface of a substrate. One embodiment is a method of coating a surface of a substrate. The method includes applying a coating composition to the surface of the substrate. The coating composition includes a) an organic solvent, b) a hydrocarbon resin and c) a copolymer having styrene and diene monomer units with a styrene-content of less than 60 wt. %, a polymer having olefin monomer units, a copolymer having styrene and olefin monomer units with a styrene content of less than 60%. wt, or mixtures thereof.

A further embodiment is a method of coating a surface of a substrate. This method includes applying a coating composition to the surface of the substrate. The coating composition includes: a) an organic solvent, b) about 25 to 85 phr of a coumarone-indene polymer and c) about 15 to 75 phr of a copolymer having styrene and diene monomer units with a styrene-content of more than 5 wt. % and less than 60 wt. %, a copolymer having olefin and styrene monomer units with a styrene-content of about 60 wt. % or less, or mixtures thereof.

Another embodiment is a method of applying a waterproofing coating to a structural unit. A coating composition is applied to a surface of the structural unit. The coating composition includes; a) about 20 to 400 phr of an organic solvent, b) about 1 to 66 phr of a coumarone-indene polymer, c) about 34 to 99 phr of a styrene-diene block copolymer having a styrene-content of about 10 to 35 wt. %, a polyolefin homopolymer, a styrene-olefin block copolymer with a styrene-content of about 10 to 60 wt. % or mixtures thereof and d) about 20 to 600 phr of a filler. The coating composition is then dried to form a film.

A further embodiment of the invention is a waterproofing composition. The waterproofing composition includes; a) about 33 phr to about 250 phr of an organic solvent, b) about 10 to 50 phr of a coumarone-indene polymer; c) about 50 to 90 phr of a copolymer having styrene and diene monomer units with a styrene-content greater than 5 wt. % and less than 60 wt. %, a polymer having olefin monomer units, a copolymer having styrene and olefin monomer units with a styrene content of about 10 to 60 wt. % or mixtures thereof.

Yet another embodiment of the invention is a waterproofing composition. The waterproofing composition includes; a) about 50 to about 150 phr of an organic solvent, b) about 10 to 30 phr of a coumarone-indene polymer, c) about 45 to 80 phr of a polymer having styrene and diene monomer units with a styrene-content of about 10 to 35 wt. %, and d) about 10 to 25 phr of a polymer having olefin monomer units and a styrene-content of about 10 to 60 wt. %.

The above summary of the present invention is not intended to describe each disclosed embodiment or every implementation of the present invention. The detailed description which follows more particularly exemplify these embodiments, but do not limit the scope of the invention, as defined by the claims.

DESCRIPTION OF THE PREFERRED EMBODIMENT

The present invention is believed to be applicable to methods and coating compositions for waterproofing and/or sealing a surface of a substrate. In particular, the present invention is directed to methods and coating compositions using a combination of a) a hydrocarbon resin and b) one or more polymers having styrene and usually, but not necessarily, diene monomer units or one or more polymers having olefin monomer units or mixtures of these polymers. While the present invention may not be so limited, an appreciation of various aspects of the invention will be gained through a discussion of the examples provided below.

The term "polymer" includes homopolymers and copolymers, unless otherwise indicated.

The term "hydrocarbon resin" is a term that is used to describe a low molecular weight thermoplastic polymer synthesized via the thermal or catalytic polymerization of coal-tar fractions, cracked petroleum distillates, terpenes, or pure olefinic monomers.

The term "monomer unit" indicates a unit of a polymer which is derived from or has the same chemical structure as a unit derived from a particular monomer.

The term "phr", as used herein, is a unit of measurement which indicates the number of parts by weight of a particular component in a coating composition having 100 parts by weight of a polymeric binder resin.

The term "substrate" includes any surface that is capable of being coated with the composition of the invention.

A preferred substrate is a "structural unit." The term "structural units" includes, by way of example, foundations, basement walls, retaining walls, cement posts, other building walls, dry wall, pool enclosures, tub and shower enclosures, highway structures (e.g., posts and walls), wooden or metal fence posts, sheet rock, plywood, wafer board, wall sheeting, pressed board, containment basins and walls, fabricated walls, floor panels, roofs, plaza decks, decks, floors, concrete, pre-stressed concrete other substrates that are buried or are exposed to water or weathering conditions, and the like. These structural units are typically made from masonry, cement, wood, plaster, stone, gypsum, clay, brick, tile, terra cotta, cardboard, paper, and the like.

A coating composition for waterproofing or sealing a structural unit or any other substrate has a polymeric binder resin in an organic solvent. In addition, the coating composition may optionally have a filler, a pigment or dye, and/or a plasticizer. Other optional components of the coating composition include, for example, an antioxidant, a UV (ultraviolet) absorber or blocker, an ozone blocker, a foaming agent, a tackifier, a perfume, and/or a deodorizer. Typically, the coating composition includes 100 parts by weight of a polymeric binder resin, about 20 to 400 phr of an organic solvent, 0 to about 600 phr of a filler, 0 to about 10 phr of a pigment or dye, and 0 to about 50 phr of a plasticizer. Other optional components of the coating composition are typically available in amounts ranging from 0 to about 10 phr.

The polymeric binder resin is a combination of (a) a hydrocarbon resin and (b) one or more polymers having styrene and usually, but not necessarily, diene monomer units or one or more polymers having olefin monomer units or mixtures of these polymers. The components of the binder resin are chosen based on the desired properties of the composition and resulting film.

The use of a hydrocarbon resin component in the polymeric binder resin is cost efficient by reducing the required amount of more costly polymeric components in the polymeric binder composition. The use of the hydrocarbon resin also reduces the amount of volatile organic components (VOCs) needed in the composition. This reduction of solvent directly lowers VOC emissions during all stages of the production, storage and application process of the coating composition. The hydrocarbon resin further improves the processability of the polymeric binder resin by lowering the overall molecular weight and viscosity of the resin. The lower viscosity aids in the application of the resin to the substrate. The use of a hydrocarbon resin also improves the flexoral modulus, and gives lower gas and vapor permeation rates to the resulting film. The hydrocarbon resin enhances the adhesive and elongation properties of the composition and resulting film. The resulting film is a non-tacky, flexible, and tough coating. The hydrocarbon resin also promotes compatibility of the components in the composition.

The styrene component of the polymeric binder resin provides hardness and durability to a film formed from the coating composition. The diene component increases the flexibility and the impact resistance of the resulting film. The olefin component gives the film increased elasticity and resistance to oxidation and degradation due to, for example, ultraviolet light, ozone, and other chemical agents in the atmosphere or soil.

Hydrocarbon Resin

Hydrocarbon resins used in accordance with the invention are low molecular weight polymers (oligomers) produced from by-product hydrocarbon, petroleum or coal tar streams. Polymerization is carried out using any one of a number of acid catalysts or as a free radical reaction using heat and pressure. The hydrocarbon resins include both natural and synthetic types; aliphatic and aromatic. Preferred hydrocarbon resins include coumarone-indene resins. Molecular weights of the hydrocarbon resins range from about 200 up to about 2000, and preferably range from about 350 to about 1000.

Coumarone-indene resins (polymers) suitable for use in the blends of this invention generally can include those resins obtained through catalytic polymerization of coal-tar naphthas. Although named after two particular components of these resins, coumarone (I) and indene (II), these resins are actually produced by the cationic polymerization of predominantly aromatic feedstocks. These feedstocks, such as, coal-tar naphthas contain resin-forming materials, for example, styrene, coumarone, indene, methyl coumarones, methyl indenes, dimethylcoumarones, dicyclopentadiene, methyl cyclopentadienes, cyclohexadienes, naphthalene, and anthracene derivatives.

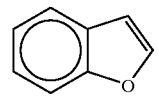

(I)

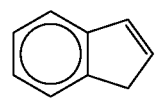

(II)

Polymerization of these resin-forming materials is effected by the catalytic action of a Bronsted acid, such as sulfuric acid or a derivative thereof, or of a Lewis acid, such as stannic chloride, antimony pentachloride, aluminum chloride, titanium tetrachloride, or boron trifluoride, on the coal tar naphthas. The polymers, generally, are not homopolymers, but are derived from mixtures of several resin-forming materials. The polymers may also be condensed with phenol and derivatives thereof, or with lower aliphatic aldehydes such as formaldehyde, or may be hydrogenated to remove residual unsaturation. Such hydrocarbon resins are commercially available and include, for example, polyindenes, polycoumarones, coumarone-indene polymers, phenol-modified coumarone-indene polymers, coumarone-indene-styrene polymers, styrene-cyclopentadiene polymers, styrene-indene polymers, dicyclopentadiene resins, terpene resins, naphthalenic resins, anthracenic resins, lignin and the like.

The most preferred hydrocarbon resins are commercially available modified coumarone-indene polymers including, for example, Nevex 100® and Cumar® from Neville Chemical Company. Vantack® 85, 95 and 105 series resins from Vanderbilt Chemical Co., may also be used.

Polymers

The polymer typically includes a combination of up to three types of polymers. These three types include a) styrene-diene copolymers having a styrene content less than 60 wt. % and typically ranges from about 5 to 60 wt. % and, preferably, from about 10 to 35 wt. %, b) polyolefins, and c) styrene-olefin copolymers having a styrene content less than 60 wt. % and typically ranges from about 10 to 60 wt. % and preferably, from about 20 to 50 wt. %. A high styrene-content polymer, such as a styrene homopolymer or copolymer having a styrene content of 60 wt. % or greater may optionally be added to least one of the above polymer or polymers. The combination of polymers are typically chosen to produce a durable film with elastomeric properties. Typically these films contain less than 60 wt % styrene thus, these films are durable while remaining elastic. These films typically contain significantly less styrene, and are more elastic than films made from the coating compositions described in U.S. Pat. No. 5,482,737.

The amounts of each type of polymer in the polymeric binder resin may be representative of a single polymer or copolymer or a combination of polymers and/or copolymers. The polymers used in the polymeric binder resin may be virgin polymers, reground polymers, recycled polymers, or mixtures thereof.

Typical diene monomer units include butadiene and isoprene. Butadiene is the preferred diene monomer unit. Typical olefin monomer units include ethylene, propylene, butylene (i.e., 1-butene and isomers), and isobutylene (i.e., isobutene). Preferred olefin monomer units include ethylene, butylene, and isobutylene.

The polymeric binder resin often includes at least one styrene-diene copolymer. One example of a suitable styrene-diene copolymer is a styrene-diene-styrene triblock copolymer which has two endblocks of polymerized styrene monomer units separated by a central block of polymerized diene monomer units. Suitable triblock polymers include, for example, styrene-butadiene-styrene (S-B-S) polymers and styrene-isoprene-styrene (S-I-S) polymers. Commercial S-B-S and S-I-S polymers include, for example, many of the Kraton® D 1100 Series polymers from Shell Chemical Company (Houston, Tex.) and Stereon® Block Copolymers from Firestone Synthetic Rubber & Latex Co. (Akron, Ohio). For example, Kraton® D 1101 and D 1102 are S-B-S polymers and Kraton® D 1107 is an S-I-S polymer. These copolymers typically have a styrene-content of about 5 to 60 wt % and usually about 10 to 35 wt %.

Another example of a suitable styrene-diene copolymer is a styrene-diene diblock polymer, such as a styrene-butadiene (S-B) copolymer or a styrene-isoprene (S-I) copolymer. Commercially available triblock polymers often include at least some diblock polymer.

The styrene-diene copolymer portion of the polymeric binder resin typically includes at least one block copolymer. Random copolymers may also be used, particularly in combination with a block copolymer or copolymers.

The polymeric binder resin often includes at least one polyolefin. Suitable examples of polyolefins include polyethylene, polypropylene, and polybutene. Preferred polyolefin include polyethylene, polybutene, polyisobutylene, and polymers having a combination of butylene and isobutylene monomer units (e.g., a polymer having about 25 to 30 wt. % isobutylene monomer units and about 70 to 75 wt. % butylene monomer units). Polyolefins may be obtained from a variety of manufacturers and distributors.

The polymeric binder resin often includes at least one styrene-olefin copolymer with a typical styrene-content less than 60 wt. % and preferably ranging from about 10 to 60 wt. %, and more preferably, about 20 to 50 wt. %. Such copolymers combine the hardness of the styrene monomer units with the elastomeric properties of the olefin monomer units. The styrene-olefin copolymer portion of the polymeric binder resin typically includes at least one block copolymer, however, random copolymers may also be used, particularly in combination with block copolymers. Examples of styrene-olefin copolymers include styrene-ethylene-butylene-styrene (S-EB-S) block copolymers, styrene-ethylene-propylene-styrene (S-EP-S) block copolymers, styrene-ethylene-butylene (S-EB) block copolymers, and styrene-ethylene-propylene (S-EP) block copolymers. Examples of these copolymers include Kraton® G 1600 and 1700 series polymers and Kraton® FG 1900 series polymers. A preferred polymer of this type is the styrene-ethylene-butylene-styrene polymer, such as, for example, many of the Kraton® G 1600 Series polymers, including Kraton® G 1650 and 1652 polymers.

The polymeric binder resin may include a polymer having a relatively high styrene-content. The high-styrene content polymer may increase the hardness and durability of a film formed from the coating composition. This high styrene-content polymer may be styrene homopolymer or a copolymer of styrene with, for example, one or more diene, olefin, acrylonitrile, and/or acrylate monomer units. Suitable high styrene-content polymers include, for example, polystyrene homopolymer, high impact polystyrene (HIPS), and medium impact polystyrene (MIPS). Both HIPS and MIPS are often copolymers of styrene and a diene, such as butadiene. HIPS and MIPS typically have a styrene content that ranges from 60 wt. % to 99 wt. %.

The impact resistance of films formed using coating compositions having high styrene-content polymers typically increases as the overall diene content increases. The diene content of the coating composition may be modified, for example, by using a polymer with higher diene-content or decreasing the amount of the high styrene-content polymer in the polymeric binder resin. The impact resistance of the film may also be modified by the addition of a plasticizer. On the other hand, the hardness of films formed using these polymers typically decreases as the diene content increases. Thus, the desired properties of the film may be tailored by varying the polymeric binder resin composition.

In one embodiment of the invention, the polymeric binder resin includes: a) about 25 to 85 phr hydrocarbon resin: b) about 15 to 75 phr of a copolymer having styrene and diene monomer units with a styrene-content of about 5 to 60 wt. %, a copolymer having olefin and styrene monomer units with a styrene content of about 60 wt. % or less, or mixture thereof.

In another embodiment of the invention, the polymeric binder resin includes: a) about 1 to 66 phr, preferably about 10 to 50 phr coumarone-indene polymer; b) about 34 to 99 phr, preferably about 50 to 90 phr of a copolymer having styrene and diene monomer units with a styrene-content of about 5 to 60 wt. % and preferably 10 to 35 wt. %, a polymer having olefin monomer units, a copolymer having styrene and olefin monomer units with a styrene content of about 10 to 60 wt. % and mixtures thereof.

In another embodiment of the invention, the polymeric binder resin includes: a) about 10 to 30 phr coumarone-indene polymer; b) about 45 to 80 phr of a polymer having styrene and diene monomer units with a styrene-content of about 10 to 35 wt. %; and c) about 10 to 25 phr of a polymer having olefin monomer units and a styrene-content of about 10 to 60 wt. %.

Solvent

The polymers and hydrocarbon resins that form the polymeric binder resin are dissolved and/or dispersed in an organic solvent to form a coating composition. The amount of solvent used determines the drying time, and appropriate method of application for the coating composition. A variety of solvents may be used. Suitable solvents which are commonly used include, for example, aromatic hydrocarbons, cycloaliphatic hydrocarbons, terpenes, unsaturated hydrocarbons, organic carbonates, and halogenated aliphatic and aromatic hydrocarbons. Suitable solvents include toluene, xylene, benzene, halogenated benzene derivatives, ethyl benzene, mineral spirits, naphtha, cyclohexane, methylene chloride, ethylene chloride, trichlorethane, chlorobenzene, propylene, ethylene carbonate, nitropropane, acetone, ethyl acetate, propyl acetate, butyl acetate, and isobutyl isobutyrate. Preferred solvents are aromatic hydrocarbons, such as toluene, xylene, benzene, and halogenated benzene derivatives, as well as mineral spirits.

For environmental reasons, it is desirable to use as little solvent as possible in the coating composition. The lower limit on the amount of solvent may be determined by the amount of solvent needed to solvate and/or disperse the components of the coating composition. If too little solvent is used, then the coating composition may be too viscous for the particular application. On the other hand, if too much solvent is used, the coating composition may not have the necessary viscosity to ensure that a proper coating is deposited on the structural unit and an excessive amount of VOCs are emitted into the environment. This can result in a film that may be thin, easily punctured, and/or have an unacceptable amount of pinholing. In addition to the use of a solvent, the viscosity of a coating composition may often be reduced by warming the coating composition. Surprisingly, the addition of hydrocarbon resins to the composition reduces the amount of solvent needed to solvate and/or disperse the components of the coating composition.

The use of the hydrocarbon resin reduces the amount of solvent or volatile organic components (VOCs) needed in the composition for a specified final film thickness. Coating a set area with a specified film thickness emits less VOCs with the hydrocarbon resin included in the coating composition than without the hydrocarbon resin in the coating composition. This reduction of solvent directly lowers VOC emissions during application of the coating composition to a substrate. Lower solvent emissions during application of the coating composition is a surprising benefit gained by using a hydrocarbon resin in the coating composition.

The desired viscosity of the coating composition often depends on the method of application of the coating composition. Coating compositions that are formulated for application using a brush or roller can often be more viscous than those formulated for spraying. The desired viscosity may also depend on whether the surface to be coated is a vertical surface, where a less viscous coating composition may run, or a horizontal surface.

The amount of solvent in the coating composition typically ranges from about 20 to 400 phr, preferably from about 33 to 250 phr, and more preferably from about 50 to 150 phr, based on 100 part by weight of the polymeric binder resin. However, larger or smaller amounts of solvent may be used depending on the desired composition and viscosity of the coating composition.

Optional Components

The coating composition typically includes a filler. The filler may increase the strength of the coating composition and/or replace costly materials of the polymeric binder resin. The filler may also modify the physical properties of the coating composition and films formed using the coating composition, including, for example, the color, opacity, affinity for other coatings, density, rheology, stiffness, and modulus of the coating composition and/or film. Any particular filler may have one or more of these, or other, functions in the coating composition.

In addition, a coating composition with a filler may more easily and reliably cover holes, depressions, recesses, cracks, and crevices in a substrate, for example, in masonry blocks, concrete, wood, and other porous or rough substrates. The presence of a filler may reduce the size and number of pinholes in a film formed from the coating composition. These pinholes arise, at least in some cases, because of gravity and/or capillary action that draws the coating composition into the hole, depression, recess, crack, or crevice in the substrate, creating a break or pinhole in the resulting film. The filler often includes particles that, because of their larger size, provide structural support that, in combination with the polymeric binder resin, forms a film across the hole, depression, recess, crack, or crevice. This reduces the tendency to form pinholes.

Surprisingly, the use of a hydrocarbon resin also increases the amount of filler that can be added to the coating composition.

Suitable fillers include, for example, carbonates, clays, talcs, silicas including fumed silica and amorphous silica, silico-aluminates, aluminum hydrate, metal oxides (e.g., oxides of aluminum, iron, zinc, magnesium, and titanium), silicates (e.g., mica), sand, Portland cement, carbon filaments, glass, fiberglass, cellulose, graphite, mortar powder, calcium carbonate, sulfates (such as magnesium or calcium sulfates), and the like. Additional suitable fillers include, for example, polymeric materials such as vinyl and other rubbers, nylon, rayon, polyesters, and the like, as well as combinations thereof, particularly combinations of rubber and the other components. These polymeric materials may be virgin, reground or recycled and may include pellets, milled or cut fibers, and other forms of the polymers. These polymeric materials do not participate in the polymeric binder resin. Preferred fillers include titanium dioxide, mica, talc, vinyl rubber, nylon, rayon, polyesters, graphite, and mixtures thereof.

The amount of filler in the coating composition typically depends on the desired properties of the composition. These properties may include the strength, flexibility, ultraviolet radiation resistance, chemical resistance, permeability, and cost of the coating composition. Often more than one type of filler is used. A combination of fillers may provide desired advantages for the coating composition and/or overcome disadvantages arising from other components in the film. Typically, the amount of filler ranges from 0 to about 600 phr, preferably about 10 to 150 phr, more preferably, about 20 to 100 phr, and most preferably about 25 to 80 phr, based on 100 parts by weight of the polymeric binder resin. Larger amounts of filler may also be used. However, if the amount of filler is too large then the polymeric binder resin may not be sufficient to hold together the film formed from the coating composition.

In some embodiments, the coating composition contains about 5 to 60 phr, and preferably about 20 to 50 phr, of a polymeric filler material, such as vinyl rubber, nylon, polyester, rayon, or combinations thereof. These polymeric filler materials often enhance the sprayability and wearability of the resulting coating compositions and films.

In some embodiments, the coating composition contains about 0.1 to 20 phr, and preferably about 5 to 15 phr, of a metallic oxide. The preferred metallic oxide is titanium dioxide.

In addition, some embodiments contain about 1 to 35 phr, and preferably about 5 to 25 phr, of a silicate, such as mica. Mica has been found to be particularly useful in reducing the size and number of pinholes.

The coating composition may optionally include a pigment or dye. The pigment or dye may impart a desired color to the coating composition and may be added for aesthetic purposes. The pigment or dye may also be included in the coating composition to, for example, aid the user in determining which portion of a surface has been covered by the coating composition. The pigment or dye may also absorb light which can harm the film. For example, the pigment or dye may absorb one or more wavelengths of ultraviolet (UV) light.

Pigments and dyes may be powders, lakes, metal flakes, organic or organometallic molecules, and the like. Examples of suitable pigments and dyes include iron lakes, iron oxide, such a red, yellow, and black iron oxides, other metal oxides, and carbon black. Typically, 0 to about 10 phr, and preferably about 0.1 to 3 phr, of pigment or dye is used. However, larger amounts may be used. In addition to compounds used primarily as pigments or dyes, the coating composition may also include other components, such as the filler material, that also act as a pigment or dye. For example, titanium dioxide which may also be a filler, is a pigment. In such cases, the amount of the filler/pigment (e.g., titanium dioxide) in the coating composition may be representative of that described above for the filler material.

Another optional additive is an antioxidant. Polymers with styrene and diene monomer units are unsaturated and are susceptible to attack by oxygen. An antioxidant may be added to the coating composition to prevent the oxidation of the polymers in the polymeric binder resin. In some commercial polymers, an antioxidant is already provided with the polymer and additional antioxidant may not be needed. For example, commercial styrene-containing and diene-containing polymers, including the Kraton® Series D 1100 and G 1600 polymers, already have an amount of antioxidant added to the polymer to facilitate manufacturing, shipping, and storage. However, additional antioxidant may be added as desired or needed.

A variety of antioxidants are known and may be included in the coating composition. One suitable type of antioxidant includes a substituted phenolic compound. Commercial antioxidants of this type include Irganox® 1010 and 565 (Ciba-Geigy Co., Ardsley, N.Y.), Ethanox® 330 (Ethyl Corp., Baton Rouge, La.), and BHT (butylated hydroxytoluene, available from a variety of sources). Other types of antioxidants may also be used.

The amount of antioxidant in the coating composition ranges from 0 to about 10 phr. If an antioxidant is used in the coating composition, the amount of antioxidant preferably range from about 0.01 to 5 phr, and more preferably from about 0.05 to 2 phr.

The coating composition may also include an ultraviolet (UV) absorber or blocker. This may be particularly useful in coating compositions that are exposed to sunlight or other sources of ultraviolet light. Examples of suitable UV absorbers or blockers include substituted benzotriazoles, hindered amines, benzophenones, and monobenzoates. Commercial UV absorbers or blockers include Tinuvin® P/300 Series and Tinuvin® 770 from Ciba-Geigy Co. (Ardsley, N.Y.), Cyasorb® UV 531 from American Cyanamid (Wayne, N.J.), and Eastman® RMB from Eastman Chemical Co. (Kingsport, Tenn.). Other types of UV absorbers or blockers may also be used.

The amount of UV absorber or blocker in the coating composition ranges from 0 to about 10 phr. If an UV absorber or blocker is used in the coating composition, the amount of UV absorber or blocker preferably range from about 0.01 to 5 phr, and more preferably from about 0.05 to 2 phr.

Ozone blockers may also be used, particularly for coating substrates that will be exposed to air or to ozone-forming devices. Examples of ozone blockers include dibutyl thiourea, nickel dibutyl-dithiocarbomate (DuPont, Wilmington, Del.), Ozone Protector 80 (Reichhold Chemicals, Durham, N.C.) and the like. The amount of ozone blocker in the coating composition ranges from 0 to about 10 phr. If an ozone blocker is used in the coating composition, the amount of ozone blocker preferably range from about 0.01 to 5 phr, and more preferably from about 0.05 to 2 phr.

The coating composition may also include a plasticizer. The plasticizer may increase the toughness and flexibility of the film resulting from the coating composition. In many cases, a plasticizer is not needed as the combination of the polymers in the polymeric binder resin plasticize each other. However, when desired or needed an additional plasticizer may be added. Examples of useful plasticizers include butyl stearate, dibutyl maleate, dibutyl phthalate, dibutyl sebecate, diethyl malonate, dimethyl phthalate, dioctyl adipate, dioctyl phthalate, butyl benzyl phthalate, benzyl phthalate, octyl benzyl phthalate, ethyl cinnamate, methyl oleate, tricresyl phosphate, trimethyl phosphate, tributyl phosphate, trioctyl adipate and the like. Other plasticizers are known.

Typically, the coating composition includes 0 to about 50 phr of plasticizer. For those embodiments that use a plasticizer, the preferred amount ranges from about 5 to 40 phr, more preferred from about 7 to 30 phr, and most preferred from about 10 to 20 phr. The amount of plasticizer used in the coating composition depends, at least in part, on the desired properties and the composition of the polymeric binder resin. Typically, the more plasticizer, the more elastic the film, however, if the amount of plasticizer is too great than the cohesiveness of the film resulting from the coating composition may decrease. A plasticizer may be particularly useful in combination with high styrene-content polymers.

Other components may be used in the coating composition. For example, it has been found that the addition of a small amount (less than 0.1 phr) of colloidal silica (e.g., Cab-O-Sil® M-5 or TS-610, Cabot Corp., Tuscola, Ill.), particularly in combination with about 1 to 10 phr of mineral spirits, causes the volume of the coating composition and the resulting film to increase. Examples of other optional components of the coating composition includes for example, perfumes, deodorants, foaming agents and tackifiers (e.g., Wingtack® series tackifiers from Goodyear Tire & Rubber Co., Akron, Ohio).

Preparation Methods

The coating composition is prepared by combining the organic solvent with the other components, including the polymers, the hydrocarbon resin, and the optional filler, pigment, antioxidant, plasticizer, and any of the other optional components. This combination is then mixed to dissolve and/or disperse the components within the solvent and form the coating composition. The mixing continues for about 30 minutes to 2 hours or until the coating composition appears creamy and the particles in the coating composition appear uniform as viewed through a falling film of the coating composition.

Various modifications can be made to this procedure. In some embodiments, the polyolefin polymer is not added until after the mixing of the solvent and the other components begins, particularly if the polyolefin polymer is a polybutene polymer (e.g., polybutylene or polyisobutylene). Polyolefin polymers, particularly polybutylene and polyisobutylene, often do not disperse well in the solvent unless the polyolefin polymer has been previously liquefied by dissolving or dispersing in a solvent, such as mineral spirits, and/or by heating. The polyolefin polymer may be added into the solvent mixture over a period of time, for example, over a period of 10 minutes or less. Preferably, the polyolefin polymer is heated to a temperature ranging from about 90 to 125° C. and mixed with mineral spirits prior to being poured into the solvent mixture, as this typically enhances dispersion of the polyolefin in the solvent.

Furthermore, for those embodiments which have vinyl rubber as a filler component, it may be desirable to allow the vinyl rubber to sit in a portion of the organic solvent for fifteen minutes to 2 hours until the vinyl rubber and the organic solvent form a paste. This paste is typically added to the mixture with the rest of the components before or shortly after adding the solvent. The formation of a paste facilitates the dispersal of the vinyl rubber filler throughout the coating composition.

Application

The coating composition can be applied by a variety of techniques, including, for example, rolling, brushing, spraying, squeeging, backrolling, pouring, troweling, or otherwise coating the surface of the substrate. A preferred application technique is spraying the coating on the substrate. Combinations of these techniques may also be used including spraying the coating composition on the structural unit and then rolling or brushing the sprayed coating composition to obtain a more uniform coating. The coating composition may be used on both interior and exterior surfaces of structures, as well as on other surfaces that need to be waterproofed.

Spraying the coating composition on the substrate requires a flowable coating composition. Many physical properties affect flowability, such as, for example, viscosity, temperature, and the like. Usually, as the viscosity is lowered, the easier it is to spray the coating composition. Normally as the temperature of the material rises, the easier it is to spray the coating composition. Coating compositions applied in cold climate areas typically require special attention to maintain the flowability of the composition.

The thickness of the coating will often depend on the particular surface and material of the structural unit, as well as the projected exposure to moisture. Rougher surfaces and surfaces in areas with more moisture may require a thicker coating. In addition, thicker coatings may be used in situations where the coating may be subject to puncturing. For example, a coating on the exterior of a below-grade masonry unit, such as a foundation, should be thick enough to withstand bridging cracks that develop in the substrate and the backfilling process. Typical dry coating thickness range from about 5 to 100 mil (about 125 to 2500 μm), and preferably from about 40 to 60 mil (about 1000 to 1525 μm). Thicker and thinner coatings may also be used depending, in part, on the desired use of the structural unit.

Upon drying, the coating composition becomes a film. Typical drying times range from 4 to 24 hours. Longer or shorter drying times may be used depending on the thickness of the applied coating composition, the air temperature and humidity and the desired amount of solvent that should be removed.

The coating composition of the present invention may be applied by itself or in conjunction with another waterproofing system. For example, the coating composition of the present invention may be coated on a structural unit, followed by the application of waterproofing sheeting. In addition, the coating composition of the present invention may be used with another coating to provide enhanced protection. A preferred coating for use with the coating of the present invention is a hard-film-forming composition, such as, for example, the compositions described in U.S. Pat. No. 5,482,737 incorporated by reference herein. In one embodiment, the hard-film-forming composition includes an organic solvent and a polymeric binder resin. The polymeric binder resin contains at least 85 wt. % of a polymer or combination of polymers having at least 75 wt. % styrene monomer units. Such polymers include polystyrene homopolymer and copolymers of polystyrene with diene, olefin, acrylate, and acrylonitryl monomer units, such as high impact or medium impact polystyrene. The preferred combination of the two coating compositions includes applying the coating composition of the present invention over the other coating. The coating composition of the present invention may, at least in some cases, be applied over the other coating before the other coating is completely dry.

EXAMPLES

The following examples further illustrate the invention. These examples are merely illustrative of the invention and do not limit the scope of the invention.

Between one quart and several gallons of each of the coating compositions (Table 1 labeled A-G) were prepared using the following materials and amounts:

TABLE 1

Materials and Amounts for the Coating Compositions

|  | A (kg) | B (kg) | C (kg) | D (kg) | E (kg) | F (kg) | G (kg) |
| --- | --- | --- | --- | --- | --- | --- | --- |
| Methylene Chloride |  |  |  |  |  | 0.5 | 0.3 |
| Xylene | 1.43 | 1.81 | 1.96 | 2.00 | 1.58 | 0.5 | 0.7 |
| Mineral Spirits | 0.46 |  |  |  |  |  |  |
| Nevex ® 100 (Coumarone-indene resin) | 0.29 | 0.43 | 0.40 | 0.40 | 0.21 | 1.5 | 2.5 |
| Kraton ® 1102 (S—B—S polymer) | 0.32 | 0.50 | 0.38 | 0.36 | 0.57 | 1.5 | 0.5 |
| Kraton ® 1107 (S—I—S polymer) | 0.43 | 0.59 | 0.43 | 0.42 | 0.50 |  |  |

TABLE 1-continued

Materials and Amounts for the Coating Compositions

| | A (kg) | B (kg) | C (kg) | D (kg) | E (kg) | F (kg) | G (kg) |
|---|---|---|---|---|---|---|---|
| Kraton ® 1650 (S—EB—S polymer) | 0.23 | 0.25 | 0.25 | 0.25 | | | |
| Vantack ® 85 | | | | | 0.40 | | |
| Talc | | | | | 0.66 | | |
| Titanium Dioxide | 0.05 | 0.07 | 0.04 | 0.03 | 0.04 | | |

Many of the components used in the Examples were available from a variety of manufacturers and distributors. For example, the Nevex 100® hydrocarbon resins were available from Neville Chemical Company (Pittsburgh, Pa.). The Kraton® polymers were available from Shell Chemical Company (Houston, Tex.). Vantack® 85 is available from Vanderbilt Chemical Company (Norwalk Conn.). Talc, titanium dioxide, xylene, methylene chloride, and mineral spirits were available from a variety of manufacturers.

The polymers, hydrocarbon resin and titanium dioxide, were combined in a vessel. The solvent (xylene and optionally mineral spirits) was then added. The solvent and other components were mixed for 20 to 45 minutes. The mixing continued until the mixture appeared creamy and the particles in the mixture appeared uniform when viewed through a falling film of the mixture.

Each coating was sprayed or brushed onto the substrate.

Each coating composition was allowed to dry on a substrate, such as a masonry block. The resulting films were solid with a minimum of pinholing and had elastomeric qualities.

TABLE 2

Materials and Amounts for Coating Compositions

| | H (kg) | I (kg) |
|---|---|---|
| Xylene | 1.95 | 1.86 |
| Nevex ® 100 (Coumarone-indene resin) | 0.73 | 0.00 |
| Kraton ® 1101 (S—B—S polymer) | | 0.86 |
| Kraton ® 1102 (S—B—S polymer) | 0.44 | 0.33 |
| Kraton ® 1107 (S—I—S polymer) | 0.20 | |
| Clay | 0.47 | |
| Titanium Dioxide | 0.09 | 0.09 |
| Talc | | 0.34 |

Formula H shown in Table 2 illustrates another example of the invention composition and is used in the viscosity tests that follow (Tables 3a, 3b and 3c). Formula I shown in Table 2 illustrates a coating composition without hydrocarbon resin used in the viscosity tests that follow (Tables 4a, 4b, and 4c).

TABLE 3a

Brookfield Viscosity Results Formula H

| Item # | Speed RPM | Torque % | Viscosity mPas | Shear Stress $N/m^2$ | Shear Rate 1/s | Temp °C. | Time MM:SS |
|---|---|---|---|---|---|---|---|
| 1 | 2.5 | 14.3 | 14300 | 12.2 | 0.85 | −9.6 | 04:02 |
| 2 | 5.0 | 25.7 | 12850 | 21.8 | 1.70 | −9.6 | 02:00 |
| 3 | 10 | 47.6 | 11900 | 40.5 | 3.40 | −9.6 | 01:00 |

TABLE 3a-continued

Brookfield Viscosity Results Formula H

| Item # | Speed RPM | Torque % | Viscosity mPas | Shear Stress $N/m^2$ | Shear Rate 1/s | Temp °C. | Time MM:SS |
|---|---|---|---|---|---|---|---|
| 4 | 20 | 89.8 | 11225 | 76.3 | 6.80 | −9.6 | 00:30 |
| 5 | 10 | 46.5 | 11625 | 39.5 | 3.40 | −9.6 | 01:00 |
| 6 | 5.0 | 24.6 | 12300 | 20.9 | 1.70 | −9.6 | 02:00 |
| 7 | 2.5 | 13.7 | 13700 | 12.2 | 0.85 | −9.6 | 04:00 |

TABLE 3b

Brookfield Viscosity Results Formula H

| Item # | Speed RPM | Torque % | Viscosity mPas | Shear Stress $N/m^2$ | Shear Rate 1/s | Temp °C. | Time MM:SS |
|---|---|---|---|---|---|---|---|
| 1 | 2.5 | 13.5 | 13500 | 11.5 | 0.85 | −0.3 | 04:01 |
| 2 | 5.0 | 20.6 | 10300 | 17.5 | 1.70 | −0.3 | 01:59 |
| 3 | 10 | 34.0 | 8500 | 28.9 | 3.40 | −0.3 | 01:00 |
| 4 | 20 | 59.8 | 7475 | 50.8 | 6.80 | −0.4 | 00:30 |
| 5 | 10 | 32.9 | 8225 | 28.0 | 3.40 | −0.4 | 01:00 |
| 6 | 5.0 | 19.8 | 9900 | 16.8 | 1.70 | −0.4 | 02:00 |
| 7 | 2.5 | 13.0 | 13000 | 11.1 | 0.85 | −0.4 | 04:00 |

TABLE 3c

Brookfield Viscosity Results Formula H

| Item # | Speed RPM | Torque % | Viscosity mPas | Shear Stress $N/m^2$ | Shear Rate 1/s | Temp °C. | Time MM:SS |
|---|---|---|---|---|---|---|---|
| 1 | 2.5 | 15.5 | 15500 | 13.2 | 0.85 | 11.6 | 04:01 |
| 2 | 5.0 | 20.5 | 10250 | 17.4 | 1.70 | 11.7 | 02:00 |
| 3 | 10 | 29.1 | 7275 | 24.7 | 3.40 | 11.7 | 01:00 |
| 4 | 20 | 44.5 | 5563 | 37.8 | 6.80 | 11.7 | 00:30 |
| 5 | 10 | 28.9 | 7225 | 24.6 | 3.40 | 11.7 | 01:00 |
| 6 | 5.0 | 20.1 | 10050 | 17.1 | 1.70 | 11.6 | 02:00 |
| 7 | 2.5 | 14.9 | 14900 | 12.7 | 0.85 | 11.6 | 04:00 |

TABLE 4a

Brookfield Viscosity Results Formula I

| Item # | Speed RPM | Torque % | Viscosity mPas | Shear Stress $N/m^2$ | Shear Rate 1/s | Temp °C. | Time MM:SS |
|---|---|---|---|---|---|---|---|
| 1 | 2.5 | 89.2 | 89200 | 75.8 | 0.85 | 30.2 | 03:42 |
| 2 | 5.0 | * | * | * | 1.70 | 30.4 | 01:59 |
| 3 | 10 | * | * | * | 3.40 | 30.4 | 01:00 |
| 4 | 20 | * | * | * | 6.80 | 30.5 | 00:30 |
| 5 | 10 | * | * | * | 3.40 | 30.6 | 01:00 |
| 6 | 5.0 | * | * | * | 1.70 | 30.7 | 02:00 |
| 7 | 2.5 | 90.6 | 90600 | 77.0 | 0.85 | 31.1 | 04:00 |

*indicates a value too high for the instrument to read

TABLE 4b

Brookfield Viscosity Results Formula I

| Item # | Speed RPM | Torque % | Viscosity mPas | Shear Stress $N/m^2$ | Shear Rate 1/s | Temp °C. | Time MM:SS |
|---|---|---|---|---|---|---|---|
| 1 | 2.5 | 99.7 | 99700 | 84.7 | 0.85 | 26.5 | 04:01 |
| 2 | 5.0 | * | * | * | 1.70 | 26.5 | 01:59 |

TABLE 4b-continued

Brookfield Viscosity Results Formula I

| Item # | Speed RPM | Torque % | Viscosity mPas | Shear Stress N/m² | Shear Rate 1/s | Temp °C. | Time MM:SS |
|---|---|---|---|---|---|---|---|
| 3 | 10 | * | * | * | 3.40 | 26.5 | 01:00 |
| 4 | 20 | * | * | * | 6.80 | 26.5 | 00:30 |
| 5 | 10 | * | * | * | 3.40 | 26.6 | 01:00 |
| 6 | 5.0 | * | * | * | 1.70 | 26.6 | 02:00 |
| 7 | 2.5 | 99.6 | 99600 | 84.7 | 0.85 | 26.5 | 04:00 |

*indicates a value too high for the instrument to read

TABLE 4c

Brookfield Viscosity Results Formula I

| Item # | Speed RPM | Torque % | Viscosity mPas | Shear Stress N/m² | Shear Rate 1/s | Temp °C. | Time MM:SS |
|---|---|---|---|---|---|---|---|
| 1 | 2.5 | * | * | * | 0.85 | 10.5 | 04:03 |
| 2 | 5.0 | * | * | * | 1.70 | 10.6 | 02:00 |
| 3 | 10 | * | * | * | 3.40 | 10.6 | 01:00 |
| 4 | 20 | * | * | * | 6.80 | 10.6 | 00:30 |
| 5 | 10 | * | * | * | 3.40 | 10.7 | 01:00 |
| 6 | 5.0 | * | * | * | 1.70 | 10.7 | 02:00 |
| 7 | 2.5 | * | * | * | 0.85 | 10.7 | 04:00 |

*indicates a value too high for the instrument to read

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

I claim:

1. A method of coating a surface of a substrate, comprising:
    applying a coating composition to the surface of the substrate, the coating composition comprising a) an organic solvent, b) a hydrocarbon resin and c) a polymer having olefin monomer units, and a copolymer having styrene and olefin monomer units with a styrene content of less than 60%. wt wherein, the copolymer having styrene and olefin monomer units comprises a styrene-ethylene-butylene-styrene block copolymer.

2. The method of claim 1, wherein the hydrocarbon resin comprises a coumarone-indene polymer.

3. The method of claim 1, wherein the polymer further comprises a styrene-diene-styrene block copolymer.

4. The method of claim 3, wherein the styrene-diene-styrene block copolymer is styrene-butadiene-styrene, styrene-isoprene-styrene, or a combination thereof.

5. The method of claim 1, wherein the coating composition further comprises a polymer having styrene monomer units with a styrene content of 60 wt. % or greater.

6. The method of claim 1, wherein the polymer having olefin monomer units comprises a polyolefin homopolymer.

7. The method of claim 1, wherein the styrene-ethylene-butylene-styrene block copolymer has a styrene-content of about 10 wt. % to about 35 wt. %.

8. The method of claim 1, further comprising a filler.

9. The method of claim 1, wherein a coating composition is applied by spraying, squeeging or combinations thereof, the coating composition onto the structural unit.

10. The method of claim 1, further comprising applying a hard-film-forming composition on a surface of the substrate prior to applying the coating composition on the surface of the substrate, the hard-film-forming composition comprising an organic solvent and a polymeric binder resin, the polymeric binder resin having at least about 85 wt. % of at least one styrene polymer having at least about 75 wt. % styrene monomer units.

11. A method of coating a surface of a substrate, comprising:
    applying a coating composition to the surface of the substrate, the coating composition comprising:
    a) an organic solvent;
    b) a hydrocarbon resin; and
    c) a polymer selected from the group consisting of a polyolefin homopolymer, a styrene-ethylene-butylene-styrene block copolymer with a styrene content of less than 60%. wt and mixtures thereof.

12. The method of claim 11 wherein, the hydrocarbon resin comprises a coumarone-indene resin.

13. The method of claim 11 wherein, the styrene-ethylene-butylene-styrene block copolymer has a styrene-content of about 10 wt. % to about 35 wt. %.

14. The method of claim 11, wherein the coating composition further comprises a polymer having styrene monomer units and a styrene content of at least 75 wt. %.

15. A method of coating a surface of a substrate, comprising:
    applying a coating composition to the surface of the substrate, the coating composition comprising:
    a) an organic solvent;
    b) a hydrocarbon resin;
    c) a styrene-ethylene-butylene-styrene block copolymer;
    d) a styrene-butadiene-styrene block copolymer; and
    e) a styrene-isoprene-styrene block copolymer.

16. The method of claim 15, wherein the organic solvent is present in the composition in a amount of about 50 to 150 phr.

17. The method of claim 15, wherein the hydrocarbon resin is present in the composition in a amount of about 25 to 35 phr.

18. The method of claim 15, wherein the styrene-ethylene-butylene-styrene block copolymer is present in the composition in a amount of about 10 to 15 phr.

19. The method of claim 15, wherein the styrene-butadiene-styrene block copolymer is present in the composition in a amount of about 10 to 15 phr.

20. The method of claim 15, wherein the styrene-isoprene-styrene block copolymer is present in the composition in a amount of about 40 to 50 phr.

* * * * *